US012644465B2

(12) United States Patent
Maniar et al.

(10) Patent No.: US 12,644,465 B2
(45) Date of Patent: Jun. 2, 2026

(54) LIMITED-CHANNEL COMPRESSOR

(71) Applicant: Garrett Transportation I Inc., Torrance, CA (US)

(72) Inventors: Malay C Maniar, Böblingen (DE); Shyamaprasad K, Bangalore (IN)

(73) Assignee: GARRETT TRANSPORTATION I INC., Torrance, CA (US)

( * ) Notice: Subject to any disclaimer, the term of this patent is extended or adjusted under 35 U.S.C. 154(b) by 0 days.

(21) Appl. No.: 18/515,248

(22) Filed: Nov. 20, 2023

(65) Prior Publication Data

US 2025/0052255 A1 Feb. 13, 2025

(51) Int. Cl.
*F04D 29/30* (2006.01)
*F04D 17/10* (2006.01)
*F04D 29/28* (2006.01)

(52) U.S. Cl.
CPC ............. *F04D 29/30* (2013.01); *F04D 17/10* (2013.01); *F04D 29/284* (2013.01); *F05D 2220/40* (2013.01); *F05D 2240/303* (2013.01); *F05D 2240/304* (2013.01)

(58) Field of Classification Search
CPC ................................ F04D 29/284; F04D 29/30
See application file for complete search history.

(56) References Cited

U.S. PATENT DOCUMENTS 2,037,880 A * 4/1936 Charavay .............. F04D 29/282 416/185
2,484,554 A 10/1949 Concordia et al.
2,570,081 A 10/1951 Szczeniowski
2,576,700 A 11/1951 Schneider
3,788,765 A 1/1974 Rusak
4,243,357 A * 1/1981 Flynn ....................... F01D 5/043 415/218.1
6,398,498 B1 * 6/2002 Boyesen ............. F04D 29/2255 416/243

* cited by examiner

*Primary Examiner* — Justin D Seabe
(74) *Attorney, Agent, or Firm* — BelayIP

(57) ABSTRACT

A compressor wheel having a hub and a plurality of impellers that define flow channels. At a restriction point downstream from an inducer-end and upstream from a point at which the flow channel turns from an axial flow to a radial flow, the impellers are thick-walled, and at that point a sum of the flow-channel restriction-point tangential dimensions is not greater than 50% of the circumference at the restriction point. The thick-walled impellers are formed with hollow cavities between pressure-side and suction-side walls. From the restriction point to an exducer, the sum of the flow-channels' tangential dimensions increases at least proportionately to the square of the radius from the axis-of-rotation.

20 Claims, 7 Drawing Sheets

LIMITED-CHANNEL COMPRESSOR

The present invention relates to a compressor wheel, and more particularly, to a centrifugal compressor wheel having restricted fluid-flow channels.

BACKGROUND

Centrifugal compressors transfer mechanical energy to a flowing stream of fluid to achieve an increased total energy level of the fluid. Typically, these compressors each include a centrifugal compressor wheel having a hub and a plurality of impellers. The impellers are formed as blades extending normal to a flow surface on a conically curved wall of the hub. While some designs may have impellers configured (i.e., shaped and positioned) to operate only on fluid flowing in a radial (outward) direction, in a typical radial compressor design the impellers and hub are configured to form fluid passageways that serially extend: axially from a primarily axial-facing inducer, to and through an axial-to-radial turn, and then radially to discharge through a primarily radial-facing exducer. Such centrifugal compressors are used in many applications, such as turbocharger systems and other automotive applications.

With reference to FIGS. 1A and 1B, two different prior art radial compressor wheels 10*a*, 10*b*, are configured to transfer mechanical energy (e.g., such as from a rotating shaft) to a flowing fluid stream to achieve an increased total energy level of the fluid. Each of the compressor wheels includes a plurality of impellers 12*a*, 12*b*, configured as blades forming fluid passageways extending normal to a flow surface wall formed on a hub 14*a*, 14*b*, of the compressor wheel. In a meridionally projected image of an axial-to-radial impeller design, the impellers are shaped to form fluid passageways that serially extend: axially from an axial-facing inducer, to and through an axial-to-radial turn that turns the flow from a primarily axial to a primarily radial direction, and then radially to discharge through a radial-facing exducer. These passageways also have a circumferential component, which may be significant in degree, but is not relevant to the meridionally projected shape of the impeller, or to the axial-to-radial turn of the fluid passage.

Such impellers 12*a* may all be configured as full blades, as depicted in FIG. 1A. The full blades all extend from an upstream end at the inducer to a downstream end at the exducer. Alternatively, such impellers 12*b* may include splitter blades 20*b* interspaced between full blades 22*b*, as depicted in FIG. 1B. Unlike the full blades, the upstream end of each of the splitter blades starts downstream from the inducer, and possibly upstream of the axial-to-radial turn.

At the inducer, each impeller may be configured to bend in a circumferential direction to axially scoop in fluid and push it in an axial direction toward the axial-to-radial turn (see, e.g., FIG. 1A). At any given location along the flow passageway (downstream from the inducer), where the movement of the fluid relative to the impeller will have a significant axial component, the tangential thickness of any of the impellers 12*a*, 12*b*, (i.e., the arclength distance around the axis-of-rotation across the impeller) is small as compared to the tangential thickness of adjoining fluid passageway. Likewise, downstream from such an inducer, the flow area of any of the flow passageways (i.e., the area across the flow passageway) is large with respect to the comparable area taken up by an adjoining impeller at a comparable flow location.

Thus, at any given location downstream from any such inducer bend, the sum of the impellers' tangential thicknesses is very significantly less than the sum of the tangential thicknesses of the fluid passageways, and the sum of the areas of the flow passageways is very significantly greater than the sum of the comparable areas of the impellers. This thin-wall design provides for maximum fluid flow, and is only limited by the wall thickness necessary for the integrity and durability to operate in the given range of static, dynamic, and thermal conditions.

Compressors can be characterized by a range of performance levels over a range of operating conditions. This may be graphically depicted on a compressor map, which plots the compressor pressure ratio against the corrected mass flow levels for a range of design operating conditions. The compressor map defines a surge line and a choke line, which correspond to the varying extreme operating conditions at which the compressor will experience surge (i.e., at which significant intermittent backflow of fluid through the compressor will occur), and choke. Typically, compressor designs providing for a wider range of operating conditions prior to experiencing surge and choke are considered preferable.

While compressors are often designed to achieve a wide range of operating conditions, there are some compressor implementations that require a particularly forgiving surge line, e.g., one that allows especially low mass-flow-rates at high pressure ratios. Such implementations can include high-intensity cooling for electronic devices, rotary devices, and batteries, in vehicles. A common approach to this challenge would call for the use of a radial compressor wheel characterized by particularly small blade-heights (the height the impellers extend from the hub on a radial compressor wheel). Such requirements can lead to manufacturing difficulties, and thereby increased manufacturing costs. Moreover, as the size of the impellers is reduced to be closer to the sizes of nearby clearances between moving and nonmoving parts, additional aerodynamic and efficiency issues might arise.

There exists a need for a compressor that operates at particularly low mass-flow-rates and high pressure ratios, and that does not require compressor impellers that are so small as to complicate manufacture or cause aerodynamic or efficiency issues. Preferred embodiments of the present invention satisfy these and other needs, and provide further related advantages.

SUMMARY

In various embodiments, the present invention may solve some or all of the needs mentioned above. The compressor of the invention has a compressor wheel including a hub and a plurality of impellers. The plurality of impellers defines a plurality of flow channels, each of which is defined by a pair of consecutively positioned impellers.

Each flow channel has an axial-flow portion leading (at least in part) axially from an inducer-end to an inclination point, and a radial-flow portion leading (at least in part) radially from the inclination point to an exducer-end. Each flow channel defines an inducer zone extending axially from its inducer-end to a flow-channel restriction point downstream from the inducer-end and upstream from the inclination point. A feature of the invention is that at least some of the impellers are thick-walled impellers at the flow-channel restriction points. A sum of the flow-channel restriction-point tangential dimensions for all of the plurality of flow channels is not greater than a limited percentage of the circumference at the flow-channel restriction points, the percentage being as low as 80%, 75%, 67%, or 50% of the circumference at the flow-channel restriction points.

Advantageously, such compressor wheels might be configured to operate at particularly low mass-flow-rates and high pressure ratios without suffering from intermittent backflow of fluid through the compressor (i.e., surge). This may be accomplished without requiring compressor blade-heights to be so small so as to complicate the manufacture of the compressor wheel, and without causing undue aerodynamic or efficiency issues.

Another feature of the invention may be that at the restriction points of the adjoining flow channels, the thick-walled impellers are each formed with a pressure-side wall and a suction-side wall. A cavity (i.e., a hollow) is formed between the pressure-side wall and suction-side wall, providing for the thick-walled impellers to be lighter than comparably sized impellers that are solid throughout. Moreover, such impellers require significantly less material to manufacture, and cause significantly less loading on the bearings should a small imbalance occur.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

DETAILED DESCRIPTION OF THE PREFERRED EMBODIMENTS

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather, it is intended to provide particular examples of them.

Typical embodiments of the present invention reside in devices incorporating a centrifugal compressor that is configured to operate at low mass-flow-rates while having high pressure ratios. Such devices might include various electric vehicles having significant cooling requirements. While traditional compressor design could call for compressor wheels having extremely small impeller blade-heights to achieve the low mass-flow-rate requirements, the manufacture of such wheels could lead to significant manufacturing complications and costs, as well as potentially limiting the reliability and durability of the resulting wheels.

First Embodiment

Figure 1A:
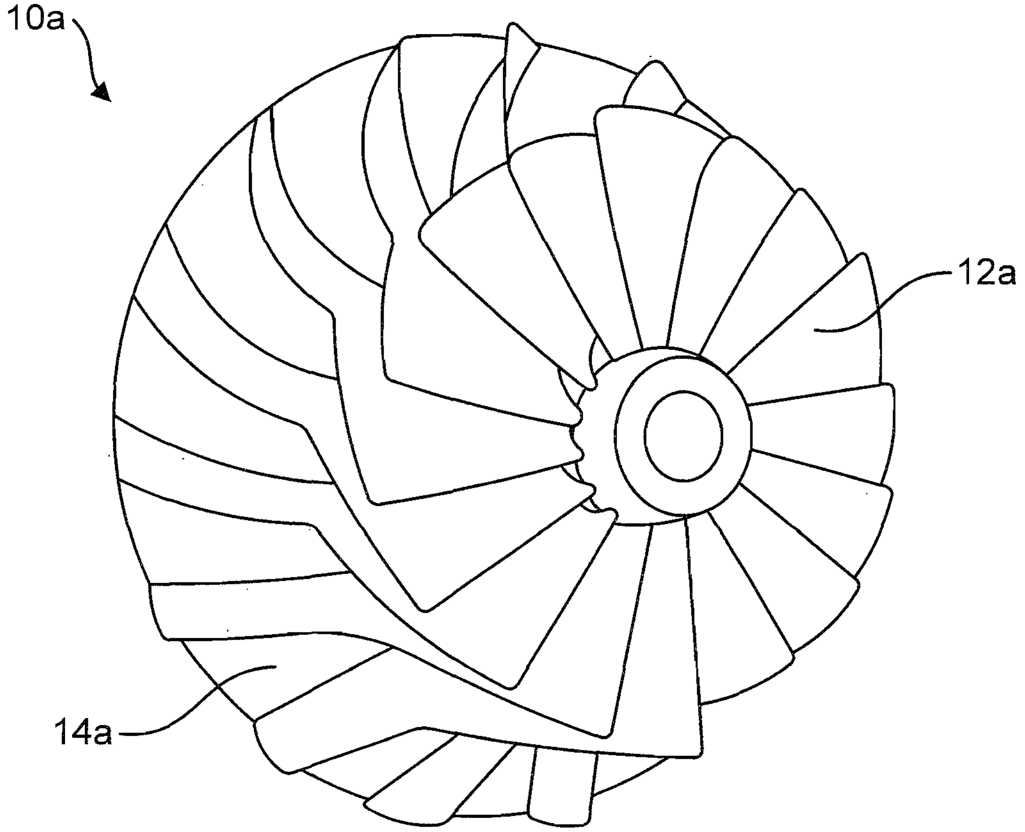
FIG. 1A (PRIOR ART)
FIG. 1A is a perspective view depicting a fourteen-blade prior art compressor wheel with fourteen full blades.
Figure 1B:
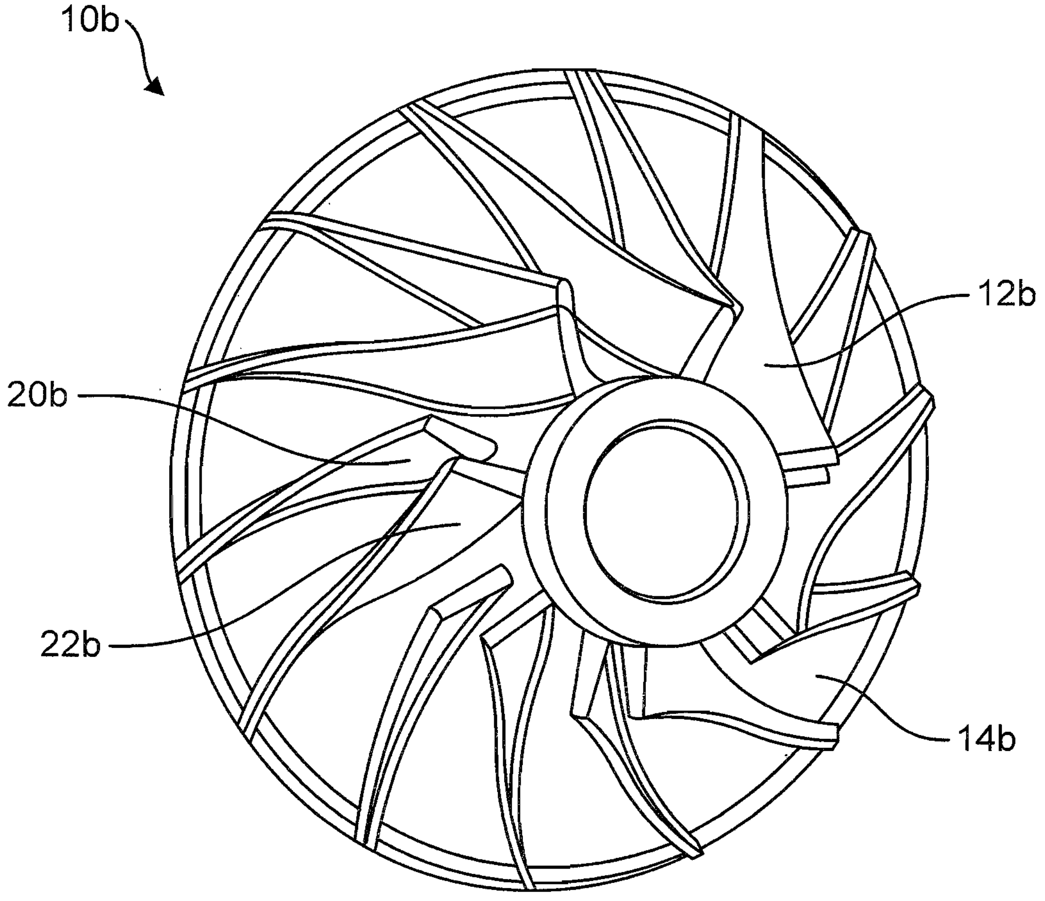
FIG. 1B (PRIOR ART)
FIG. 1B is a perspective view depicting a fourteen-blade prior art compressor wheel with seven full blades and seven splitter blades.
Figure 2:
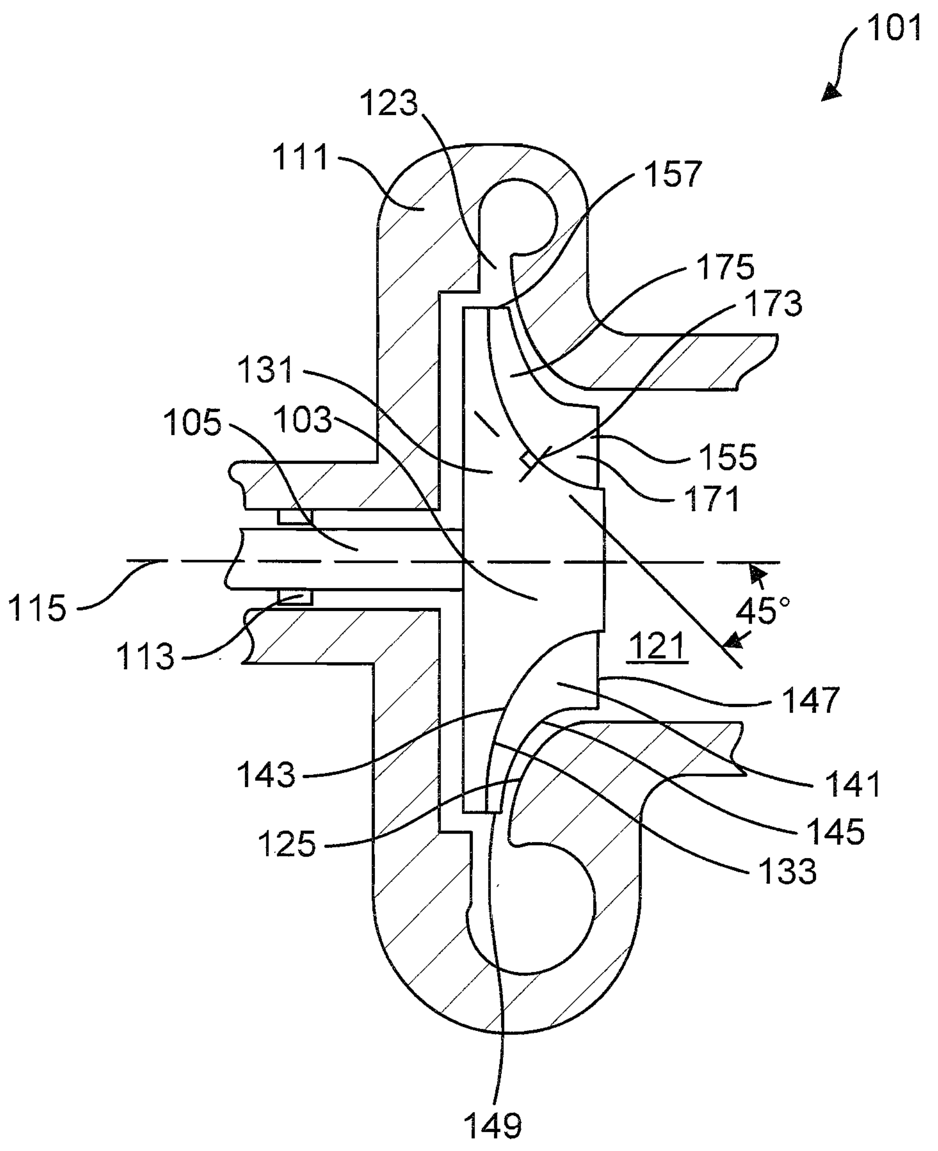
FIG. 2 is a cross-sectional meridional side view depicting a compressor in a first embodiment of the invention.
Figure 3A:
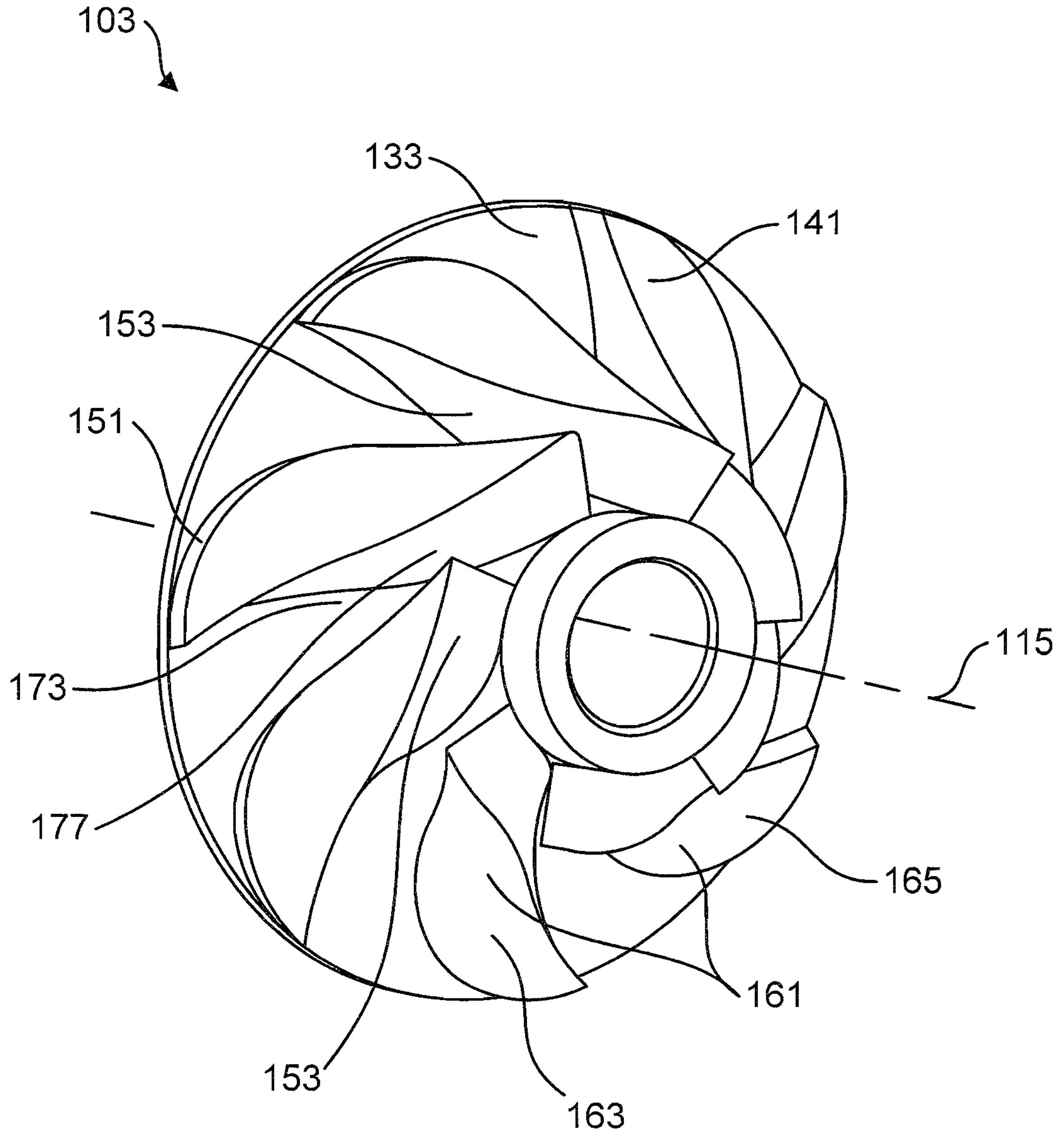
FIG. 3A is a perspective view depicting a seven wide-blade compressor wheel of the embodiment depicted in FIG. 2.

With reference to FIGS. 2-3A, a first embodiment of a centrifugal compressor 101 under the invention may include a rotor having a wheel 103 mounted on a shaft 105. The wheel is a centrifugal compressor wheel configured for compressing a fluid stream of a compressible fluid. The rotor is supported within a housing 111 by bearings 113 such that the wheel may be driven in rotation (with respect to the housing) along an axis-of-rotation 115 by the shaft 105. The housing forms an axially oriented inlet 121, being a passageway that is provided with a stream of fluid flowing from a source of fluid to be compressed, and a radially oriented outlet 123 (such as a diffuser and a volute) that receives the fluid stream after it is compressed by the wheel 103. The housing also forms a shroud wall 125 connecting a wall of the inlet 121 to a wall of the outlet 123. While the outlet is depicted as purely radial (when taken meridionally), a mixed-flow outlet (having an axial component to the outlet direction, when taken meridionally) is within the scope of a radially oriented outlet. Likewise, while the inlet is depicted as purely axial (when taken meridionally), a mixed-flow inlet (having a radial component to the inlet direction, when taken meridionally) is within the scope of an axially oriented inlet.

The wheel includes a hub 131 that defines the axis-of-rotation 115, and a plurality of impellers 141. The hub forms a fluid-flow wall 133 that is rotationally symmetric around the axis-of-rotation 115. The fluid-flow wall has a flow surface that sequentially extends from the inlet 121, to run axially (with the surface primarily facing radially outward) from an axial-inlet edge at the inlet, through an axial-to-radial curve, to run radially (with the surface primarily facing axially back toward the inlet) to/toward a radial-outlet edge at the outlet 123.

The plurality of impellers 141 extend from the flow surface of the fluid-flow wall 133. These impellers are consecutively positioned around the axis-of-rotation 115, typically in a rotationally symmetric arrangement. Each impeller 141 of the plurality of impellers extends outward from a hub-end 143 of the impeller at the fluid-flow wall 133, to a shroud-end 145 of the impeller facing the shroud wall 125 of the housing. The distance between the fluid-flow wall 133 and the shroud-end 145 defines the blade-height, which varies over the length of the impeller from the inlet to the outlet.

The hub-end 143 and shroud-end 145 of each impeller 141 run from a leading edge 147 of the impeller to a trailing edge 149 of the impeller. The leading edge 147 is positioned and shaped to receive, draw and/or scoop the stream of fluid flowing in from the inlet 121. The trailing edge 149 is positioned and shaped to radially and circumferentially direct and eject the stream of fluid out into the outlet 123.

A pressure-side surface 151 of each impeller 141 runs from its leading edge 147 to its trailing edge 149, and extends between the hub-end 143 and the shroud-end 145. This pressure-side surface 151 faces in the impeller's direction of travel as the wheel 103 is driven in rotation (around the axis-of-rotation 115). On the opposite side (from the pressure-side surface 151) of each impeller, a suction-side surface 153 of the impeller runs from the leading edge 147 to the trailing edge 149, and extends between the hub-end 143 and the shroud-end 145. The suction-side surface 153 faces away from the impeller's direction of travel as the wheel is driven in rotation. The shroud wall 125 surrounds the curved 3-dimensional area through which the shroud-ends 145 of the impellers 141 travel as the wheel is driven in rotation.

Pairs of the consecutively positioned impellers (i.e., consecutive pairs of the consecutively positioned impellers) each define a flow channel therebetween, and thus the plurality of impellers form a plurality of flow channels. For every pair of consecutively positioned impellers 161 (i.e., one rotationally positioned immediately next to the other), there is a respective leading impeller 163, and a respective trailing impeller 165. The respective leading impeller immediately leads the respective trailing impeller as the wheel 103 is driven in rotation, with a respective flow channel defined in the gap therebetween. A respective hub channel-adjoining portion of the fluid-flow wall 133 adjoins the flow channel and extends across the gap between the two consecutively positioned impellers. At any given rotation of the wheel, some portion of the shroud wall 125 is aligned (to extend across the gap between the two consecutively positioned impellers) to form a shroud channel-adjoining portion of the shroud wall 125 that adjoins the flow channel.

Thus, for every pair of consecutively positioned impellers 161, the respective flow channel that is defined is bordered by the respective hub channel-adjoining portion of the fluid-flow wall 133, the suction-side surface 153 of the respective leading impeller 163, the pressure-side surface 151 of the respective trailing impeller 165, and the respective shroud channel-adjoining portion of the shroud wall 125 that is present at the given rotational location of the wheel 103 within the housing 111. This respective flow channel extends from an inducer-end 155 at the inlet (i.e., at the respective leading edge 147) to an exducer-end 157 at the outlet (i.e., at the respective trailing edge 149). As the wheel is driven in rotation, the area through which the inducer-ends 155 travel defines an axial-facing inducer for the compressor wheel 103. Likewise, as the wheel is driven in rotation, the area through which the exducer-ends 157 travel defines a radial-facing exducer for the compressor wheel.

Each flow channel of the plurality of flow channels has an axial-flow portion 171 serially leading axially from the inducer-end 155 of the flow channel to an inclination point 173 of the flow channel. Each flow channel of the plurality of flow channels also has a radial-flow portion 175 generally leading radially from the inclination point to the exducer-end 157 of the flow channel. The inclination point 173 is defined herein to be the point at which the overall direction of the flow channel, when taken meridionally (i.e., without consideration of the circumferential direction of the flow channel), transitions from being primarily in an axial-flow direction (i.e., more axial than radial) to primarily in a radial-flow direction (i.e., more radial than axial). Thus, the axial-flow portion 171 is defined herein to be the portion of the flow channel from the inducer-end 155 of the flow channel to the inclination point 173, and the radial-flow portion 175 is defined herein to be the portion of the flow channel from the inclination point 173 to the exducer-end 157 of the flow channel.

Within the respective axial-flow portion 171 of each flow channel, the flow channel defines a respective inducer zone extending axially from its respective inducer-end 155 of the flow channel to a respective restriction point 177 of the flow channel. The restriction point is downstream from the respective inducer-end 155, and upstream from the respective inclination point 173.

In order to restrict the mass flow through the impellers, some or all of the impellers are thickened beyond the dimensions needed for structural integrity and aerodynamic contouring, so as to restrict fluid flow through the flow channels. These thick-wall impellers restrict fluid flow in at least the axial-flow portions 171 of some or all of the flow channels, and therefore provide flow restrictions that allow for the flow channels (and thereby the impellers) to be taller than would otherwise be required to meet the restricted mass-flow requirements.

FIG. 3A depicts a wheel with seven thick-wall impellers defining seven flow channels. These impellers are sized and positioned roughly as if there were fourteen historically typical impellers (i.e., fourteen thin-wall impellers rather than the seven thick-wall impellers), with the gap filled in between every other pair of consecutive thin-wall impellers to form a total of seven thick-wall impellers. This leaves only seven flow channels, and seven thick-walled impellers approximately the size of the filled in gaps. Each flow channel between the thick-walled impellers is sized the same as a flow channel in the comparable fourteen thin-wall impeller design. At the location of the respective restriction points 177 within the flow channels, the combined thickness of all the impellers 141 is significant enough to significantly restrict the overall fluid flow through the plurality of flow channels.

The thin-walled impellers would be thick enough to have the structural integrity and structural characteristics necessary for the dynamic environment, but not so much as to cause a restricted flow due to thickness-based blocking of the flow. If a sum was taken of the mean flow-channel tangential dimensions (i.e., the sum of the average tangential dimensions of the flow-channels) of fourteen thin-wall impeller flow channels at a given radial distance, this sum would be slightly less than the circumference at that radial distance (i.e., it would be less by the combined thicknesses of the fourteen thin-wall impellers). Because the seven thick-wall impeller flow channels are individually the same size as their fourteen equivalent thin-wall impeller flow channels, including their associated thin-wall impellers, if a sum is taken of the flow-channel tangential dimensions of the seven thick-wall impeller flow channels at their thick-wall restriction points 177, this sum will be is approximately (slightly less than) 50% (seven out of fourteen) of the circumference around the flow-channel restriction points. Each tangential dimension is defined herein as the arclength distance around the axis-of-rotation.

Thus, in this seven thick-wall impeller embodiment, or in any embodiment having only thick-wall impellers that are sized as two connected equally spaced thin-wall impellers, the sum of the flow-channel restriction-point tangential dimensions for all of the plurality of flow channels is not functionally greater than 50% (one out of each two) of the circumference around the flow-channel restriction points 177. A flow-channel restriction-point tangential dimension is defined herein to be the tangential dimension of the flow channel at the restriction point of the flow channel. The term functionally greater is defined herein as being greater than, by an amount that causes a change in the functional mass-flow-rate, that amount being of measurable significance as compared to the amounts caused by dimensional variations within the manufacturing tolerances of the wheel.

In some variations of the first embodiment, where fewer than every other impeller pair is filled in such that one or more traditional (thin-wall impeller) full blades or splitter blades are interposed between the thick-wall impellers of the first embodiment, different levels of flow restriction are achieved by using other relative sizes of the flow channels at the restriction point 177. For example, with one interposed thin-wall impeller (and therefore two flow channels) between each pair of thick-wall impellers, and with each of the thick-wall impellers being the same circumferential size as each flow channel, the sum of the flow-channel restriction-point tangential dimensions is not functionally greater than 67% (two out of three) of the circumference around the flow-channel restriction points.

With two interposed thin-wall impellers (and therefore three flow channels) between each pair of thick-wall impellers, and with each of the thick-wall impellers being the same circumferential size as each flow channel, the sum of the flow-channel restriction-point tangential dimensions is not functionally greater than 75% (three out of four) of the circumference around the flow-channel restriction points 177. With three interposed thin-wall impellers (and therefore four flow channels) between each pair of thick-wall impellers, and with each of the thick-wall impellers being the same circumferential size as each flow channel, the sum of the flow-channel restriction-point tangential dimensions is not functionally greater than 80% (four out of five) of the circumference around the flow-channel restriction points. These ratios of the summed flow-channel restriction-point tangential dimensions to the circumference are relevant indications of the invention regardless of whether the associated numbers of traditional thin-wall impellers are present between the thick-wall impellers for these various levels of spacing.

Figure 3B:
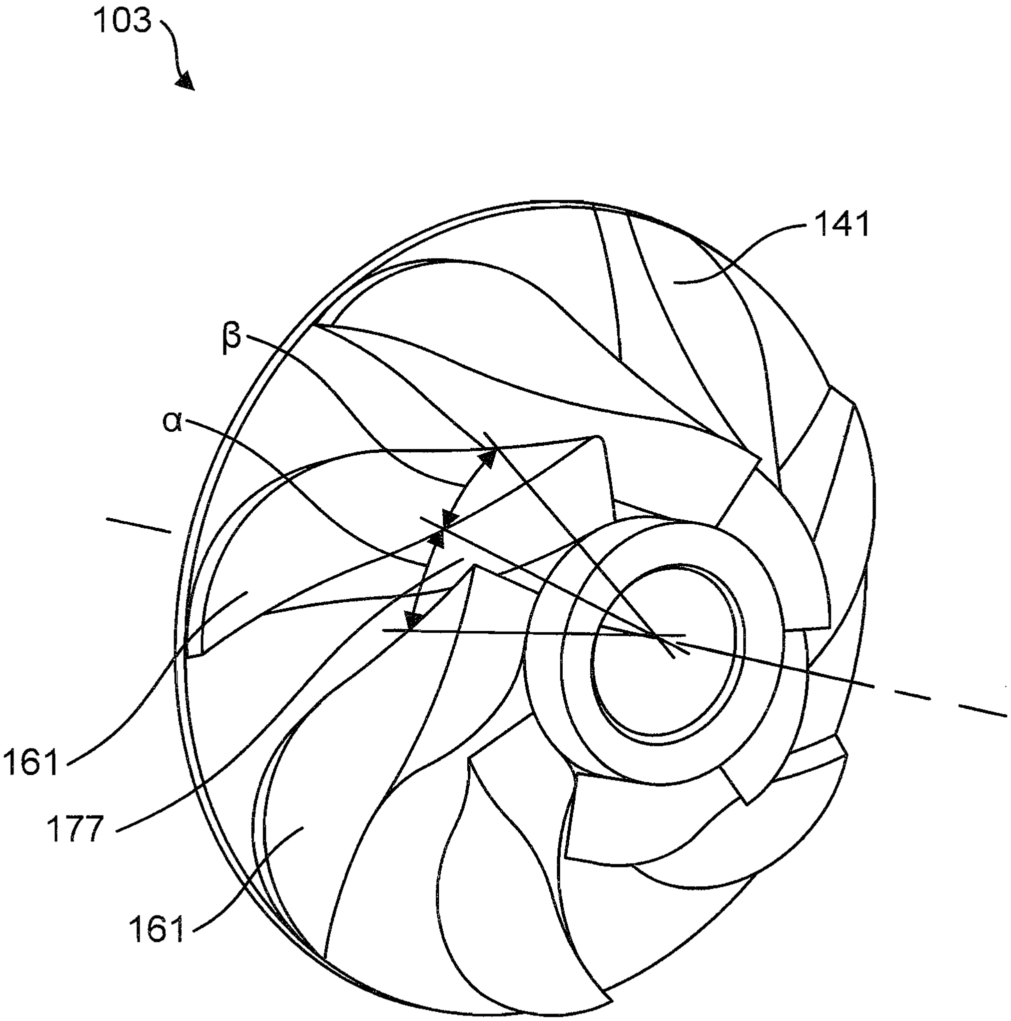
FIG. 3B is a perspective view depicting the variables a and p, which can change for some variations of the embodiment depicted in FIG. 3A.

With reference to FIG. 3B, in each of these interposed thin-wall variations, the thick-wall impellers could have their described size without any (or with fewer) thin-wall impellers interposed in-between. In FIG. 3B, each impeller 141 of the wheel 103 has its own impeller restriction-point tangential dimension β (being a length around the circumference taken at a related, e.g., rotationally following, flow-channel restriction point). Each impeller restriction-point tangential dimension β will typically (but not necessarily) be of the same magnitude as every other. Each flow channel, being between its consecutively positioned impellers 161, has its own flow-channel restriction-point tangential dimension α (being an average length around the circumference at its flow-channel restriction point—the average being taken over its blade-height). Each flow-channel tangential dimension α will typically (but not necessarily) be the same magnitude as the others. As was the case for the base (unvaried) case of this embodiment, the sum of the flow-channel restriction-point tangential dimensions α is not functionally greater than 80%, 75%, 67%, or 50% of the circumference around the flow-channel restriction points 177 (i.e., of the combined total of the impeller restriction-point tangential dimensions β and the flow-channel restriction-point tangential dimensions α).

In other words, the sum of the flow-channel restriction-point (mean) tangential dimensions could be as much as (and not functionally greater than) 80% even though there are two, one, or no intermediate thin-wall impellers. Likewise, the sum of the flow-channel restriction-point tangential dimensions could be as much as (and not functionally greater than) 75% even though there are one or no intermediate thin-wall impellers, the sum of the flow-channel restriction-point tangential dimensions could be as much as (and not functionally greater than) 67% even though there are no intermediate thin-wall impellers. In short, a wide range of combinations of impeller restriction-point tangential dimensions β and flow-channel restriction-point tangential dimensions α (with respect to the total circumference) are within the scope of the invention.

Flow-Channel Dimensional Variation

In this first embodiment, each flow channel increases in its flow-channel tangential dimension from the restriction point 177 to the exducer-end 157. As depicted, from the restriction point to the exducer-end, the sum of the flow-channel tangential dimensions of the plurality of flow channels increases at least proportionately to the square of the radius from the axis-of-rotation (i.e., it increases proportionally to the increase in circumference).

For reasons such as maximization of flow efficiency, there may be variations where the sum of the flow-channel tangential dimensions (of the plurality of flow channels) doesn't continuously and proportionately increase along with the circumference. In one such variation, the sum (around the circumference) of the (mean) flow-channel tangential dimensions (of the plurality of flow channels) strictly increases (i.e., continuously increases) from the restriction point 177 to the exducer-end 157. In another variation, the sum of the flow-channel tangential dimensions (of the plurality of flow channels) monotonically increases (i.e., does not decrease) from the restriction point to the exducer-end.

In additional variations, the sum (around the circumference) of the (mean) impeller restriction-point tangential dimensions (of the plurality of impellers) monotonically decreases (i.e., does not increase) from the restriction point to the exducer-end 157. In other variations, the sum of the impeller restriction-point tangential dimensions (of the plurality of impellers) strictly decreases (i.e., continuously decreases) from the restriction point to the exducer-end. In another variation, from the restriction point 177 to the exducer-end, the sum of the impeller restriction-point tangential dimensions (of the plurality of impellers) is greatest at the restriction point. In yet another variation, from the inducer-end 155 to the exducer-end, the sum of the impeller restriction-point tangential dimensions (of the plurality of flow channels) is greatest at the restriction point.

Additionally, in some variations a flow channel ratio, being defined herein as the ratio of the sum of the flow-channel tangential dimensions (of the plurality of flow channels) to the circumference, strictly increases from the restriction point 177 to the exducer-end 157. In other variations, the flow channel ratio monotonically increases (i.e., does not decrease) from the restriction point to the exducer-end. In yet other variations, from the inducer-end 155 to the exducer-end, the flow-channel ratio is greatest at the restriction point.

Second Embodiment

It might be desirable for manufacturing and/or functionality reasons to minimize the mass of the wheel. To that end, in a second embodiment of the invention the mass of the impellers is limited while maintaining their functionally effective dimensions. To that end, some or all of the thick-wall impellers may be formed entirely or in-part as hollow bodies rather than solid bodies, i.e., formed as multi-wall impellers that have more than one wall to form a hollow cavity therebetween.

Figure 4:
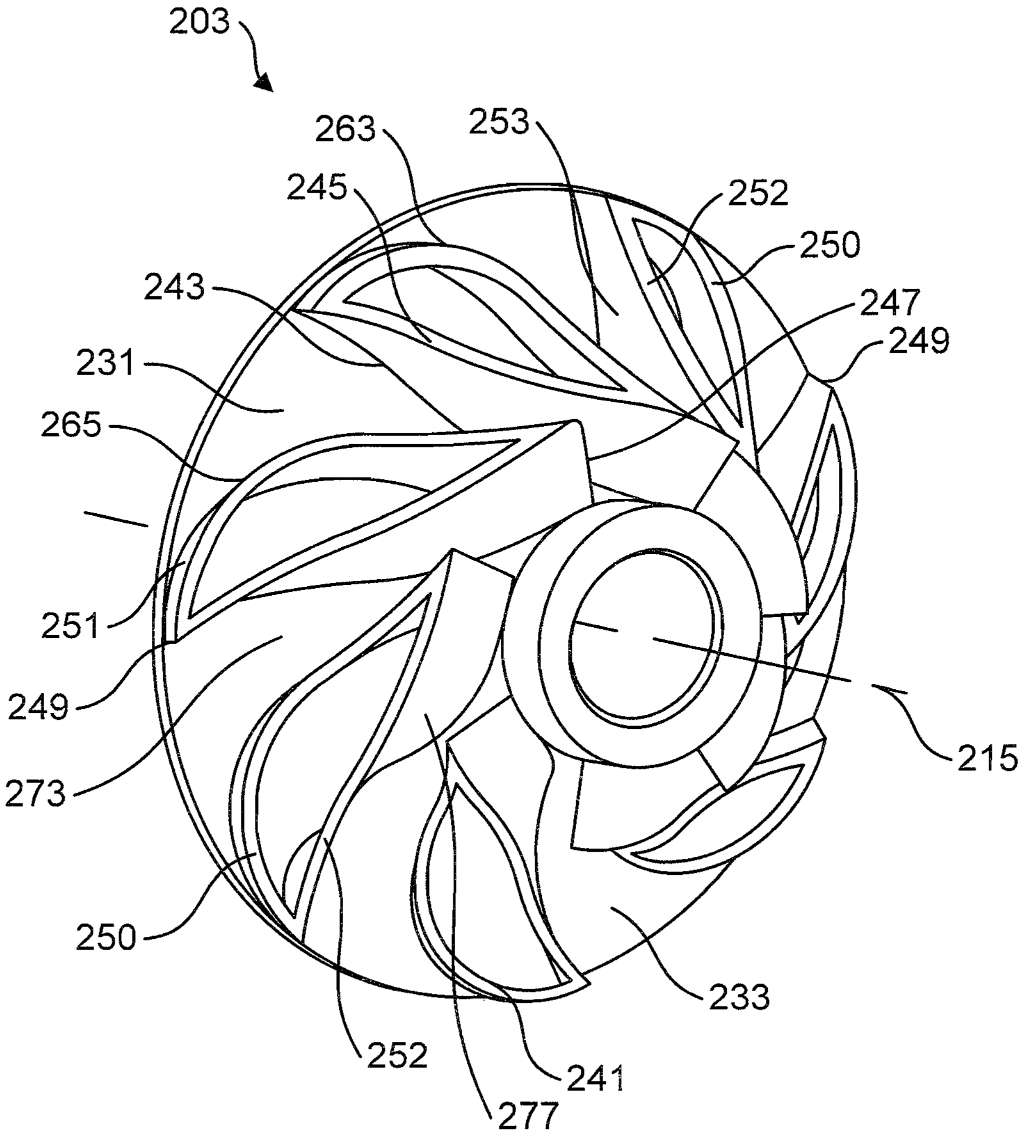
FIG. 4 is a perspective view depicting a seven wide-blade compressor wheel in a second embodiment of the invention.

With reference to FIG. 4, and with like numbers suggesting similar features, a second embodiment of a centrifugal compressor under the invention may include a rotor having a wheel 203 mounted on a shaft. Similar to the first embodiment: the wheel is a centrifugal compressor wheel; the rotor is supported within a housing by bearings along an axis-of-rotation 215 by the shaft; the housing forms an axially oriented inlet and a radially oriented outlet; and the housing forms a shroud wall connecting the inlet to the outlet.

The wheel includes a hub 231 that defines the axis-of-rotation 215, and a plurality of impellers 241. The hub forms a fluid-flow wall 233 that is rotationally symmetric around the axis-of-rotation 215. The fluid-flow wall has a flow surface that sequentially extends from the inlet, to run axially from an axial-inlet edge at the inlet, through an axial-to-radial curve, to run radially to/toward a radial-outlet edge at the outlet.

The plurality of impellers 241 extend from the flow surface of the fluid-flow wall 233. These impellers are consecutively positioned around the axis-of-rotation 215 in a rotationally symmetric arrangement. Each impeller 241 of the plurality of impellers extends outward from a hub-end 243 of the impeller at the fluid-flow wall 233, to a shroud-end 245 of the impeller facing the shroud wall of the housing. Likewise, the hub-end 243 and shroud-end 245 of each impeller 241 run from a leading edge 247 of the impeller to a trailing edge 249 of the impeller, wherein the leading edge 247 receives, draws and/or scoops the stream of fluid flowing in from the inlet, and the trailing edge 249 directs and ejects the stream of fluid out into the outlet.

A pressure-side surface 251 of each impeller 241 runs from its leading edge 247 to its trailing edge 249, and extends between the hub-end 243 and the shroud-end 245. This pressure-side surface 251 faces in the impeller's direction of travel. On the opposite side (from the pressure-side surface 251), a suction-side surface 253 runs from the leading edge 247 to the trailing edge 249, and extends between the hub-end 243 and the shroud-end 245. The suction-side surface 253 faces away from the impeller's direction of travel.

As in the first embodiment, consecutive pairs of the consecutively positioned impellers define flow channels therebetween, and for every pair of consecutively positioned impellers, there is a leading impeller 263, and a trailing impeller 265. A hub channel-adjoining portion of the fluid-flow wall 233 adjoins the flow channel and extends across the gap between the two consecutively positioned impellers. At any given rotation of the wheel, some portion of the shroud wall is aligned to form a shroud channel-adjoining portion of the shroud wall.

Thus, for every pair of consecutively positioned impellers, the respective flow channel that is defined is bordered by the respective hub channel-adjoining portion of the fluid-flow wall 233, the suction-side surface 253 of the respective leading impeller 263, the pressure-side surface 251 of the respective trailing impeller 265, and the respective shroud channel-adjoining portion that is present. This respective flow channel extends from an inducer-end at the inlet (i.e., at the respective leading edge 247) to an exducer-end at the outlet (i.e., at the respective trailing edge 249). As before, when driven in rotation the areas through which the inducer-ends and exducer-ends travel define an axial-facing inducer and a radial-facing exducer, respectively.

As previously identified in the first embodiment, each impeller of the plurality of impellers is a thick-wall impeller that defines a restriction point 277 of an adjoining (e.g., rotationally following) flow channel, the restriction point being downstream from the inducer-end of the flow channel and upstream from an inclination point 273 of the flow channel. At that restriction point 277, this thick-wall impeller forms a pressure-side wall 250 forming the pressure-side surface 251 of the impeller, and a suction-side wall 252 forming the suction-side surface 253 of the impeller. The pressure-side wall 250 and the suction-side wall 252 form a hollow cavity therebetween, making it a multi-wall impeller that is lighter than the equivalent solid thick-wall impeller of the first embodiment.

In this version of a multi-wall impeller, the pressure-side wall 250, the suction-side wall 252, and the cavity therebetween all serially extend from the leading edge 247, to the restriction point 277 (of an adjacent flow channel), to the inclination point 273 (of an adjacent flow channel), and on to the trailing edge 249 (of an adjacent flow channel). Thus, for each multi-wall impeller of the plurality of impellers: the pressure-side wall, the suction-side wall, and the cavity therebetween extends from the restriction point to and past the inclination point (of an adjoining flow channel); extends from the restriction point to the trailing edge (of an adjoining flow channel); and extends from the leading edge to the trailing edge (of an adjoining flow channel). Other versions may include multi-wall impellers having pressure-side walls and suction-side walls extending less than the full length of the impeller.

Third Embodiment

The first and second embodiments have a common feature in that the housing forms a shroud wall establishing a boundary on the flow channels at the shroud-ends of the impellers. Without movement, this shroud wall surrounds the curved 3-dimensional area through which the shroud-ends of the thick-wall impellers travel as the wheel is driven in rotation. The wheel rotates relative to this unmoving shroud wall. A shroud-gap between the impeller shroud-ends and the shroud wall allows some fluid to flow around and past the pressure-side wall of the trailing impeller, which may affect both the efficiency of the compressor, and the resulting compressor map characteristics. Similar effects might occur suction-side wall of the leading impeller. These effects are complicated in the second embodiment, wherein fluid passing through this shroud-gap can flow into a chamber formed by the shroud wall of the housing covering the cavity between the pressure-side wall and the suction-side wall.

Figure 5:
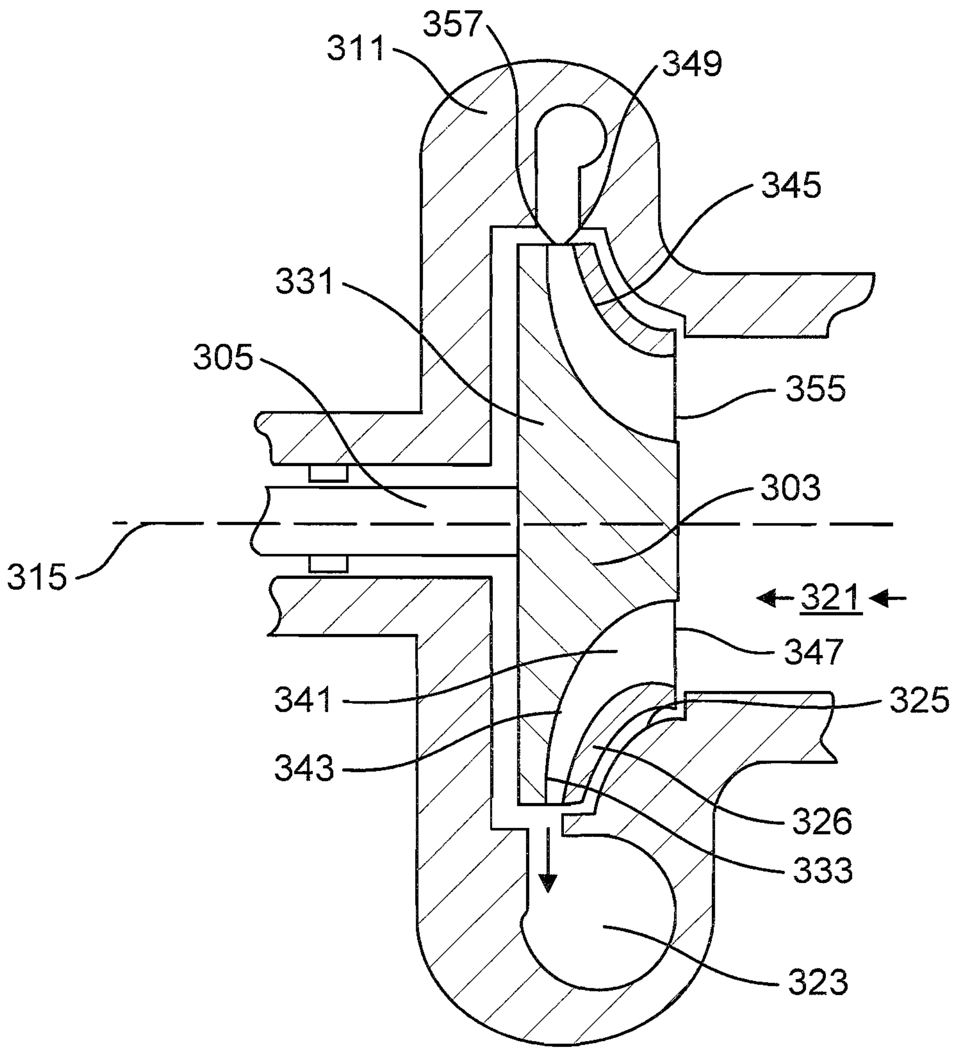
FIG. 5 is a cross-sectional meridional side view of a compressor including a constituent shroud in a third embodiment of the invention.

With reference to FIG. 5, and with like numbers suggesting similar features, a third embodiment of a centrifugal compressor under the invention may include a rotor having a wheel 303 mounted on a shaft 305. Similar to the first and second embodiments: the wheel is a centrifugal compressor wheel; the rotor is supported within a housing 311 by bearings along an axis-of-rotation 315 by the shaft; and the housing forms an axially oriented inlet 321 and a radially oriented outlet 323. The housing forms a surrounding wall 325 connecting the inlet to the outlet.

The wheel includes a hub 331 that defines the axis-of-rotation 315, a plurality of impellers 341, and a constituent shroud 326 (i.e., a shroud that connects to and/or rotates with the wheel, such as a shroud that is integral with the wheel). The hub forms a fluid-flow wall 333 that is rotationally symmetric around the axis-of-rotation 315. The fluid-flow wall has a flow surface that sequentially extends from the inlet 321, to run axially from an axial-inlet edge at the inlet, through an axial-to-radial curve, to run radially to/toward a radial-outlet edge at the outlet 323.

The plurality of impellers 341 extend from the flow surface of the fluid-flow wall 333. These impellers are consecutively positioned around the axis-of-rotation 315 in a rotationally symmetric arrangement. Each impeller 341 of the plurality of impellers extends outward from a hub-end 343 of the impeller at the fluid-flow wall 333, to a shroud-end 345 of the impeller facing toward the surrounding wall 325 of the housing 311. Likewise, the hub-end 343 and shroud-end 345 of each impeller 341 run from a leading edge 347 of the impeller to a trailing edge 349 of the impeller, wherein the leading edge 347 receives, draws and/or scoops the stream of fluid flowing in from the inlet 321, and the trailing edge 349 directs and ejects the stream of fluid out into the outlet 323.

The constituent shroud 326 is a rotationally symmetric, conically curved body either affixed to the shroud-ends 345 of the impellers or integral with those shroud-ends. The constituent shroud extends from the leading edge 347 of each impeller to the trailing edge 349 of each impeller, and rotates with the wheel.

A pressure-side surface of each impeller 341 runs from its leading edge 347 to its trailing edge 349, and extends between the hub-end 343 and the shroud-end 345. This pressure-side surface faces in the impeller's direction of travel. On the opposite side (of the flow channel from the pressure-side surface), a suction-side surface runs from the leading edge 347 to the trailing edge 349, and extends between the hub-end 343 and the shroud-end 345. The suction-side surface faces away from the impeller's direction of travel.

As in both prior embodiments, consecutive pairs of the consecutively positioned impellers define flow channels therebetween, and for every pair of consecutively positioned impellers, there is a leading impeller and a trailing impeller. A hub channel-adjoining portion of the fluid-flow wall 333 adjoins the flow channel and extends across the gap between the two consecutively positioned impellers.

For every pair of consecutively positioned impellers, the respective flow channel that is defined is bordered by the respective hub channel-adjoining portion of the fluid-flow wall 333, the suction-side surface of a respective leading impeller, the pressure-side surface of a respective trailing impeller, and a shroud channel-adjoining portion of the constituent shroud 326 that overlies the respective flow channel. This respective flow channel extends from an inducer-end 355 at the inlet (i.e., at the respective leading edge 347) to an exducer-end 357 at the outlet (i.e., at the respective trailing edge 349). As before, when driven in rotation the areas through which the inducer-ends and exducer-ends travel define an axial-facing inducer and a radial-facing exducer, respectively.

As in the second embodiment, each impeller of the plurality of impellers defines a restriction point of an adjoining (e.g., rotationally following) flow channel, the restriction point being downstream from the inducer-end of the flow channel and upstream from an inclination point of the flow channel. At that restriction point, this multi-wall impeller forms a pressure-side wall forming the pressure-side surface of the impeller, and a suction-side wall forming the suction-side surface of the impeller. The pressure-side wall and the suction-side wall form a hollow cavity therebetween, thereby making it a multi-wall impeller that is lighter than the equivalent impeller of the first embodiment.

In this version of a multi-wall impeller, the pressure-side wall, the suction-side wall, and the cavity therebetween all serially extend: from the leading edge 347, to the restriction point (of an adjacent flow channel), to the inclination point (of an adjacent flow channel), and to the trailing edge 349 (of an adjacent flow channel). Thus, for each multi-wall impeller of the plurality of impellers, the pressure-side wall, the suction-side wall, and the cavity therebetween may extend: from the restriction point past the inclination point (of an adjoining flow channel); from the restriction point to the trailing edge (of an adjoining flow channel); or from the leading edge to the trailing edge (of an adjoining flow channel). Other versions may include multi-wall impellers having pressure-side walls and suction-side walls extending less than the full length of the impeller.

Over each impeller, a respective shroud cavity-adjoining portion of the constituent shroud 326 forms a respective chamber cover extending from a shroud edge of the respective pressure-side wall of the impeller to a shroud edge of the respective suction-side wall of the impeller. Therefore, the impeller has a chamber cover that covers and/or seals its respective cavity between the pressure-side wall and the suction-side wall, limiting and/or preventing fluid communication with the cavity (i.e., between the cavity and either an adjoining flow channel or the fluid streams in the inlet or outlet).

Moreover, over each flow channel, a respective shroud channel-adjoining portion of the constituent shroud 326 forms a respective channel cover extending from a shroud edge of the respective pressure-side wall of the trailing impeller to a shroud edge of the respective suction-side wall of the leading impeller. The channel cover covers and seals the flow channel, preventing lateral fluid communication with (into or out of) the flow channel (i.e., flow other than downstream flow via the inlet and outlet).

Thus, the constituent shroud connects to each multi-wall impeller of the plurality of impellers to both seal the respective cavities between the pressure-side wall and the suction-side wall of each multi-wall impeller, and seal the respective flow channels between the multi-wall impellers.

While the third embodiment includes a single, unitary shroud cover configured to provide both chamber covers and channel covers, in other variations the shroud cover could be more limited. For example, the shroud cover could be made in separate portions that are affixed to one another and/or affixed only to the wheel. Likewise, the shroud cover could include only chamber covers, only channel covers, or limited numbers of one or both types of cover.

It is to be understood that the invention comprises apparatus and methods for designing and for producing a compressor wheel and housing, as well as the apparatus of the compressor wheel itself. Moreover, while this invention is described for a compressor, structurally similar turbine wheels may also be within the scope of the invention unless otherwise limited by the claims. Moreover, while this invention is described for compressing compressible fluids, compressor wheels for pumping incompressible fluids are within the scope of the invention unless otherwise limited by the claims. In short, the above disclosed features can be combined in a wide variety of configurations within the anticipated scope of the invention.

While particular forms of the invention have been illustrated and described, it will be apparent that various modifications can be made without departing from the spirit and scope of the invention. For example, while the depicted embodiments have purely axial inducers and radial exducers, a radial-to-axial centrifugal compressor is clarified and defined herein to include compressors that draw in fluid through a primarily axial-facing inducer, and expel that fluid through a primarily radial-facing exducer. Thus, although the invention has been described in detail with reference only to the preferred embodiments, those having ordinary skill in the art will appreciate that various modifications can be made without departing from the scope of the invention. Accordingly, the invention is not intended to be limited by the above discussion, and is defined with reference to the following claims.

What is claimed is:

1. A compressor wheel for compressing a fluid, comprising:

a hub defining an axis-of-rotation, the hub forming a flow surface extending from an axial-inlet edge to a radial-outlet edge; and a plurality of impeller blades extending from the flow surface, the plurality of impeller blades being consecutively positioned around the axis-of-rotation, each impeller blade having a leading edge and a trailing edge;

wherein the plurality of impeller blades defines a plurality of flow channels, each flow channel being defined by a pair of consecutively positioned impeller blades, each flow channel extending from an inducer-end at the respective leading edges, to an exducer-end at the respective trailing edges, and each flow channel having an axial-flow portion leading axially from the inducer-end to an inclination point and a radial-flow portion leading radially from the inclination point to the exducer-end;

wherein each flow channel defines a respective inducer zone extending axially from its respective inducer-end to a respective flow-channel restriction point located within the axial-flow portion and axially downstream from the respective inducer-end and axially upstream from the respective inclination point;

wherein, at the restriction points, a sum of the flow-channel restriction-point tangential dimensions, each flow channel restriction-point tangential dimension being a blade-height-averaged arclength of the respective flow channel around the axis-of-rotation, is not functionally greater than 80% of the circumference at the restriction points;

wherein the plurality of impeller blades comprises thick-walled blade structures extending from the hub and defining the plurality of flow channels between them such that the reduced number of flow channels, relative to a compressor wheel having an equivalent outer diameter and blade height with thin-walled impeller blades, produces a functional reduction in total mass-flow rate that remains beyond dimensional changes attributable to manufacturing tolerances.

2. The compressor wheel of claim 1, wherein the sum of the flow-channel restriction-point tangential dimensions for the plurality of flow channels is not functionally greater than 75% of the circumference around the flow-channel restriction points.

3. The compressor wheel of claim 1, wherein the sum of the flow-channel restriction-point tangential dimensions for the plurality of flow channels is not functionally greater than 67% of the circumference around the flow-channel restriction points.

4. The compressor wheel of claim 1, wherein the sum of the flow-channel restriction-point tangential dimensions for the plurality of flow channels is not functionally greater than 50% of the circumference around the flow-channel restriction points.

5. The compressor wheel of claim 1, wherein the sum of the tangential flow-channel dimensions across the plurality of flow channels is monotonically increasing from the restriction point to the exducer-end.

6. The compressor wheel of claim 1, wherein the sum of the flow-channel restriction-point tangential dimensions for the plurality of flow channels is strictly increasing from the restriction point to the exducer-end.

7. The compressor wheel of claim 1, wherein from the restriction point to the exducer-end, the sum of the impeller restriction-point tangential dimensions is greatest at the restriction point.

8. The compressor wheel of claim 1, wherein the plurality of impellers includes a plurality of multi-wall impellers, each multi-wall impeller blade having a pressure-side wall and a suction-side wall that together define an associated cavity, an enclosed cavity being substantially isolated from the flow channel regions at a restriction point of a respective flow channel.

9. The compressor wheel of claim 8, wherein for each multi-wall impeller of the plurality of impellers, the pressure-side wall, the suction-side wall, and the cavity therebetween extends from the leading edge to the restriction point.

10. The compressor wheel of claim 8, wherein for each multi-wall impeller of the plurality of impellers, the pressure-side wall, the suction-side wall, and the cavity therebetween extends from the restriction point to the inclination point of an adjoining flow channel.

11. The compressor wheel of claim 8, wherein for each multi-wall impeller of the plurality of impellers, the pressure-side wall, the suction-side wall, and the cavity therebetween extends from the restriction point to the trailing edge.

12. The compressor wheel of claim 8, wherein for each multi-wall impeller of the plurality of impellers, the pressure-side wall, the suction-side wall, and the cavity therebetween extends from the leading edge to the trailing edge.

13. The compressor wheel of claim 8, wherein each multi-wall impeller of the plurality of impellers has a chamber cover limiting fluid communication with the cavity.

14. The compressor wheel of claim 8, and further comprising a constituent shroud affixed to or integral with the impeller blades, the shroud enclosing the plurality of flow channels from their inducer-ends to their exducer-ends, and enclosing the respective cavity of each multi-wall impeller blade so as to provide a continuous fluid seal between adjacent channels and each blade cavity.

15. A compressor, comprising:

a compressor wheel of claim 1; and a housing containing the compressor wheel, the housing forming a chamber surrounding the trailing edges of the plurality of inducers.

16. A compressor wheel for compressing a fluid, comprising:

a hub defining an axis-of-rotation, the hub forming a flow surface extending from an axial-inlet edge to a radial-outlet edge; and a plurality of impeller blades extending from the flow surface, the plurality of impeller blades being consecutively positioned around the axis-of-rotation, each impeller of the plurality of impellers having a leading edge, and a trailing edge;

wherein the plurality of impellers defines a plurality of flow channels, each flow channel being defined by a pair of consecutively positioned impellers from their respective leading edges to their respective trailing edges, each flow channel having an axial-flow portion leading axially from an inducer-end to an inclination point and a radial-flow portion leading radially from the inclination point to an exducer-end;

wherein the plurality of flow channels defines an inducer zone extending axially from the respective inducer-ends to respective flow-channel restriction points located within the axial flow portions and axially downstream from the respective leading edges and axially upstream from the respective inclination points; and wherein the plurality of impellers includes a plurality of multi-wall impellers, each multi-wall impeller blade having a pressure-side wall and a suction-side wall that together define an enclosed cavity, the enclosed cavity being substantially isolated from the flow channel regions at the restriction point of a respective flow channel; and wherein a sum of the tangential dimensions at the flow-channel restriction points, each each tangential dimenion being a blade height-averaged arclength of a respective flow channel around the axis-of-rotation, is not functionally greater than 80% of the circumference at those restriction points, such that the reduced number of flow channels relative to a compressor wheel having an equivelant outer diameter and blade height with thin-walled impeller baldes produces functional reduction in total mass-flow rate that remains beyond dimensional changes attributable to manufacturing tolerances.

17. The compressor wheel of claim 16, wherein for each multi-wall impeller of the plurality of impellers, the pressure-side wall, the suction-side wall, and the cavity therebetween extends from the leading edge to the trailing edge.

18. The compressor wheel of claim 17, wherein each multi-wall impeller of the plurality of impellers includes a chamber cover limiting fluid communication with the cavity.

19. The compressor wheel of claim 17, and further including a constituent shroud connecting to each multi-wall impeller of the plurality of impellers to both enclose the plurality of flow channels from their inducer-ends to their exducer-ends, and to enclose the respective cavity of each multi-wall impeller.

20. A compressor, comprising:

a compressor wheel of claim 16; and a housing containing the compressor wheel, the housing forming a chamber surrounding the trailing edges of the plurality of inducers.

* * * * *